(12) United States Patent
Krishnan et al.

(10) Patent No.: US 6,961,809 B2
(45) Date of Patent: Nov. 1, 2005

(54) MANAGING A POSITION-DEPENDENT DATA SET THAT IS STORED IN A CONTENT ADDRESSABLE MEMORY ARRAY AT A NETWORK NODE

(75) Inventors: Ram Krishnan, Santa Clara, CA (US); Apurva Mehta, Cupertino, CA (US); Michael R. MacFaden, San Jose, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 244 days.

(21) Appl. No.: 10/321,871

(22) Filed: Dec. 17, 2002

(65) Prior Publication Data

US 2003/0225964 A1 Dec. 4, 2003

Related U.S. Application Data

(60) Provisional application No. 60/386,078, filed on Jun. 4, 2002.

(51) Int. Cl.[7] .............................................. G06F 12/00
(52) U.S. Cl. ..................................................... 711/108
(58) Field of Search ................................ 711/108, 217; 709/223; 365/49

(56) References Cited

U.S. PATENT DOCUMENTS

| 5,765,165 | A | 6/1998 | Harper |
| 6,081,440 | A | 6/2000 | Washburn et al. |
| 6,526,474 | B1 * | 2/2003 | Ross ........................... 711/108 |
| 6,615,311 | B2 * | 9/2003 | Ramakrishnan ............. 711/108 |
| 6,629,114 | B2 | 9/2003 | Ramakrishnan |
| 6,651,096 | B1 * | 11/2003 | Gai et al. .................... 709/223 |

OTHER PUBLICATIONS

"Distributed System Concepts and Design"—George Coulouris Jean Dollimore Tim Kindberg 3rd edition 2001, pp 84-87.*

"Routing on logest-matching prefixes" Doeringer. W Karjoth G. Nassehi M IEEE/ACM Transactions on Networking Feb. 1996.*

* cited by examiner

Primary Examiner—Pierre-Michel Bataille
(74) Attorney, Agent, or Firm—Mark A. Wilson

(57) ABSTRACT

Managing a position-dependent data set that is stored in a content addressable memory (CAM) array involves identifying an instance of a base position-dependent data set that exists in software, identifying an instance of an edited position-dependent data set that exists in software, determining differences between the instance of the base position-dependent data set that exists in software and the instance of the edited position-dependent data set that exists in software, and incorporating the differences between the instance of the base position-dependent data set that exists in software and the instance of the edited position-dependent data set that exists in software into an instance of said base position-dependent data set that exists in a CAM array.

30 Claims, 10 Drawing Sheets

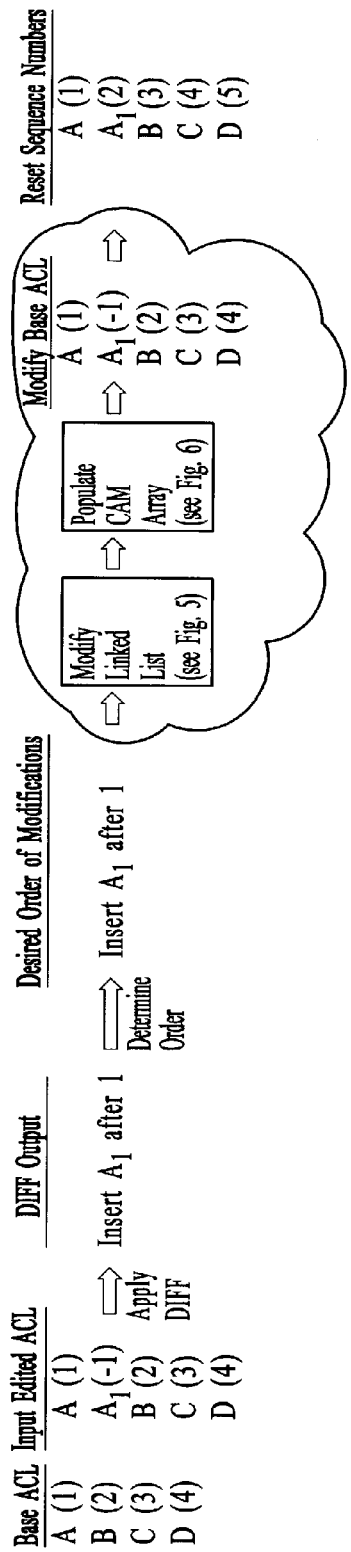
FIG. 4
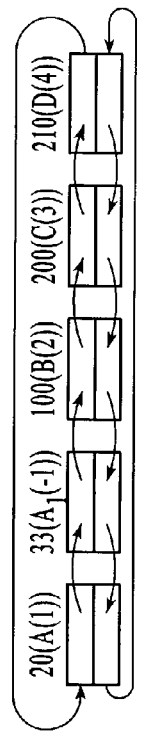
FIG. 5
FIG. 6

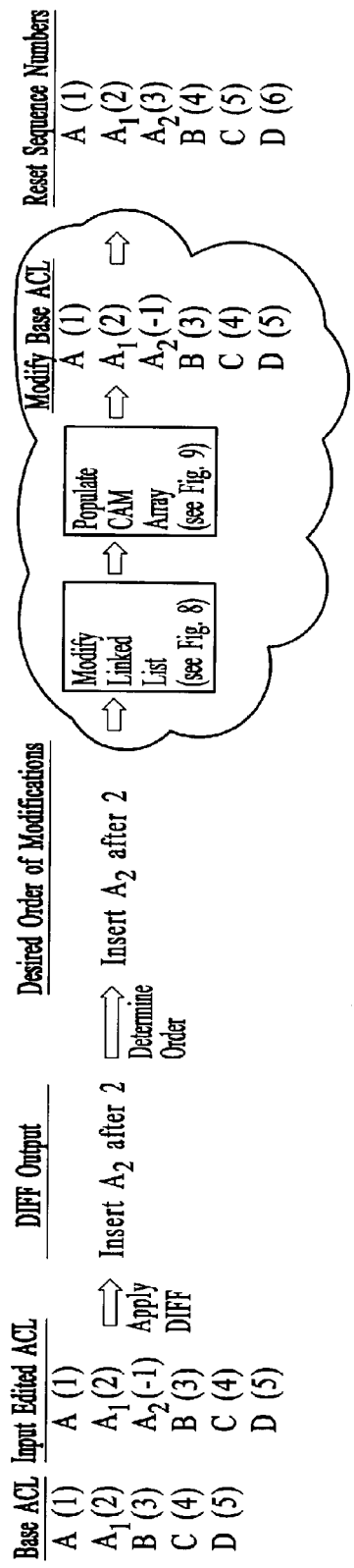
FIG. 7
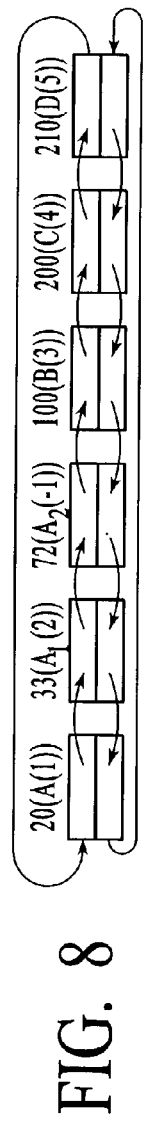
FIG. 8
FIG. 9

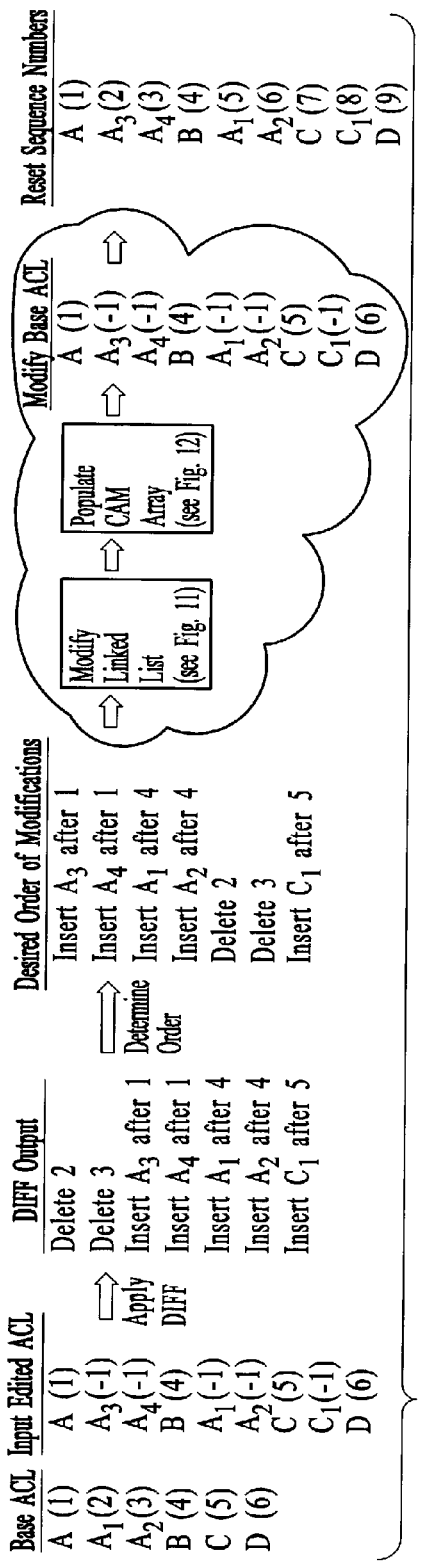
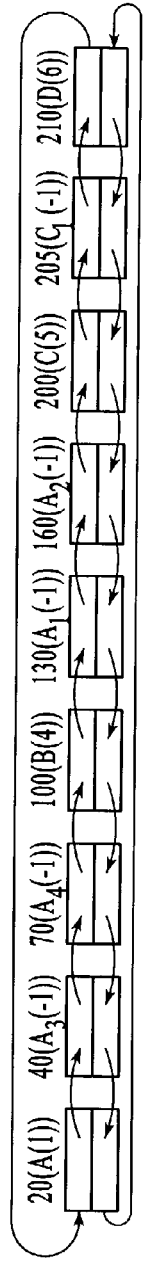
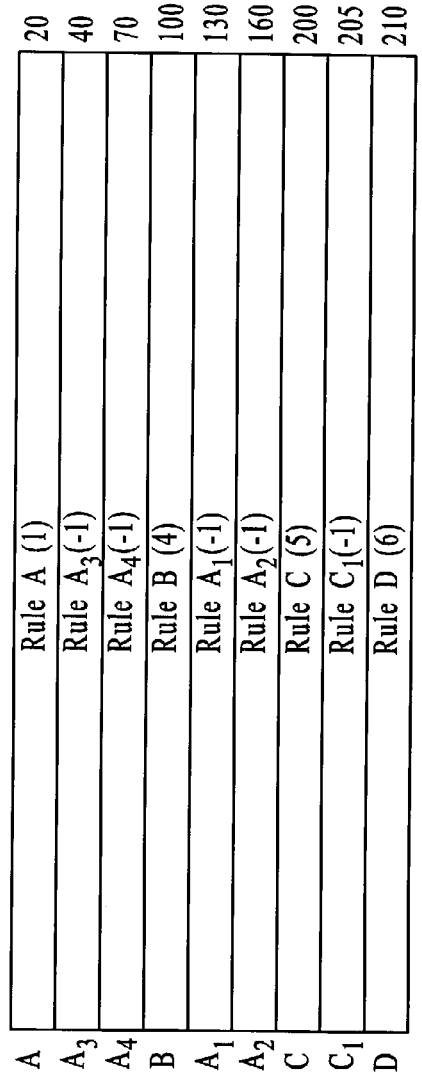
FIG. 10
FIG. 11
FIG. 12

MANAGING A POSITION-DEPENDENT DATA SET THAT IS STORED IN A CONTENT ADDRESSABLE MEMORY ARRAY AT A NETWORK NODE

CROSS REFERENCE TO RELATED APPLICATION

This application is entitled to the benefit of provisional patent application Ser. No. 60/386,078, filed Jun. 4, 2002.

FIELD OF THE INVENTION

The invention relates to managing a content addressable memory (CAM) at a network node, and more particularly, to managing a CAM array that is used to store a position-dependent data set.

BACKGROUND OF THE INVENTION

In order to support high-speed networking systems, access control lists (ACLs) are maintained in content addressable memory (CAM) arrays at network nodes to grant or deny access to incoming packets to the network. Typically, ACLs that are implemented in a CAM array operate on a first match basis. That is, when a packet is subjected to an ACL, the first ACL entry that matches with certain criteria of the incoming packet (i.e., matches a certain packet profile) is used to determine whether access will be granted or denied to the packet. Because network access is determined on a first match basis when an ACL is implemented in a CAM array, the order of ACL entries in the CAM array is important. In particular, populating an ACL in a CAM array must be performed in a manner that maintains the designated order of the ACL entries. Because the designated order of ACL entries must be maintained, populating an ACL often requires that existing ACL entries be rewritten to the CAM array so that new ACL entries are placed in the proper order within the CAM array. Rewriting data in a CAM array is relatively slow when compared to rewriting data in other types of memory (i.e., up to one hundred times slower than rewriting the same data to random access memory (RAM)). Since rewriting data such as ACL entries into a CAM array is relatively slow, when changes need to be made to a CAM-based ACL, rewriting ACL entries may subject traffic to a "rough" or transitional CAM array profile while the ACL entries are being rewritten. This may lead to inaccurate application of ACL rules to incoming traffic.

FIGS. 1A–1C depict an embodiment of a conventional technique for populating an ACL that is stored in a CAM array. FIG. 1A depicts a base ACL that is stored in a CAM array. Entries in the ACL are referred to herein as ACL entries. The ACL entries are identified by the capital letters to the left of the CAM array and a corresponding ACL rule is identified within each ACL entry. An example CAM array address identifier (ID) is identified by the number to the right of each ACL entry.

FIG. 1B depicts a "base ACL" which includes the ACL set W, X, Y, and Z, and a "new ACL" which includes the ACL set W, X, $X_1$, Y, and Z. The base ACL represents an ACL before editing and the new ACL represents the same ACL after it has been modified to include ACL edits. In the example of FIG. 1B, a new ACL entry, $X_1$, is added as a result of ACL editing. The new ACL entry is designated for insertion after ACL entry X and before ACL entry Y. The new ACL reflects the order in which the ACL entries should exist in the CAM array.

A conventional technique for populating CAM arrays with new ACL entries involves rewriting all of the ACL entries to the CAM array in the new order. Rewriting the entire new ACL into the CAM array ensures that the ACL entries are stored in the designated order. Although rewriting the entire ACL into the CAM array ensures that all of the ACL entries are stored in the designated order, rewriting the entire new ACL into the CAM array can, as described above, lead to application of a rough CAM array profile to incoming traffic.

FIG. 1C depicts an example of how the CAM array may be populated with the new ACL set when using a conventional technique. As depicted in FIG. 1C, although entry $X_1$ has been inserted between entries X and Y, all of the ACL entries have been rewritten into the CAM array, as indicated by the CAM array address IDs to the right of the CAM array, which have all changed from those in FIG. 1A. In an alternate embodiment, rather than rewriting every ACL entry in the CAM array, only those ACL entries below the first modified ACL entry are rewritten. A drawback to this alternative is that rewriting only those ACL entries below the first modified ACL entry may still result in the application of rough CAM array profiles, especially if the first change is at the top of the ACL.

In view of the need to minimize the roughness of the CAM array profile, what is needed is a technique for managing an ACL in a CAM array that maintains the proper order of ACL entries while reducing the number of ACL entries that need to be rewritten.

SUMMARY OF THE INVENTION

Managing a position-dependent data set that is stored in a content addressable memory (CAM) array involves identifying an instance of a base position-dependent data set that exists in software, identifying an instance of an edited position-dependent data set that exists in software, determining differences between the instance of the base position-dependent data set that exists in software and the instance of the edited position-dependent data set that exists in software, and incorporating the differences between the instance of the base position-dependent data set that exists in software and the instance of the edited position-dependent data set that exists in software into an instance of the base position-dependent data set that exists in a CAM array. The disclosed techniques enable application of smoother CAM array profiles to incoming traffic.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 depicts an example of a technique for managing an ACL that is stored in a CAM, according to an embodiment of the invention.

FIG. 5 depicts an embodiment of the linked list depicted in FIG. 3 that has been edited based on the DIFF output described with reference to the functions depicted in FIG. 4, according to an embodiment of the invention.

FIG. 6 depicts an embodiment of the CAM array depicted in FIG. 2 after the CAM array has been populated using the DIFF output and the linked list as described above with reference to FIGS. 4 and 5, according to an embodiment of the invention.

FIG. 7 depicts another example of a technique for managing an ACL that is stored in a CAM, according to an embodiment of the invention.

FIG. 8 depicts an embodiment of the linked list depicted in FIG. 5 that has been edited based on the DIFF output described with reference to the functions depicted in FIG. 7, according to an embodiment of the invention.

FIG. 9 depicts an embodiment of the CAM array depicted in FIG. 6 after the CAM array has been populated using the DIFF output and the linked list as described above with reference to FIGS. 7 and 8, according to an embodiment of the invention.

FIG. 10 depicts another example of a technique for managing an ACL that is stored in a CAM, according to an embodiment of the invention.

FIG. 11 depicts an embodiment of a the linked list depicted in FIG. 8 that has been edited based on the DIFF output described with reference to the functions depicted in FIG. 10, according to an embodiment of the invention.

FIG. 12 depicts an embodiment of the CAM array depicted in FIG. 9 after the CAM array has been populated using the DIFF output and the linked list as described above with reference to FIGS. 10 and 11, according to an embodiment of the invention.

DETAILED DESCRIPTION OF THE INVENTION

Managing a position-dependent data set that is stored in a content addressable memory (CAM) array involves identifying an instance of a base position-dependent data set that exists in software, identifying an instance of an edited position-dependent data set that exists in software, determining differences between the instance of the base position-dependent data set that exists in software and the instance of the edited position-dependent data set that exists in software, and incorporating the differences between the instance of the base position-dependent data set that exists in software and the instance of the edited position-dependent data set that exists in software into an instance of the base position-dependent data set that exists in a CAM array. In an embodiment, the position-dependent data set is an access control list (ACL).

Figures 1A, 1B, 1C:
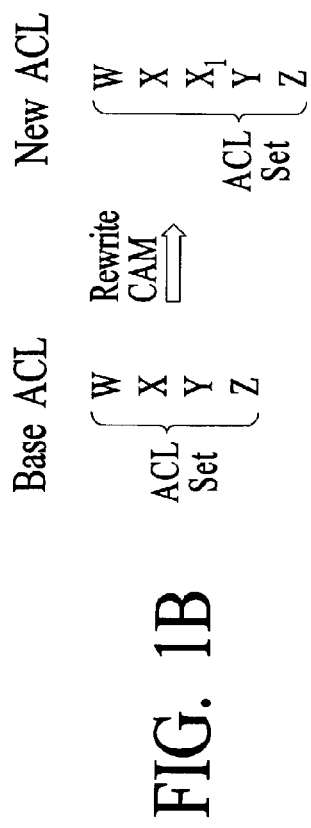
FIGS. 1A–1C depict an embodiment of a conventional technique for populating an ACL that is stored in a CAM array.
Figure 2:
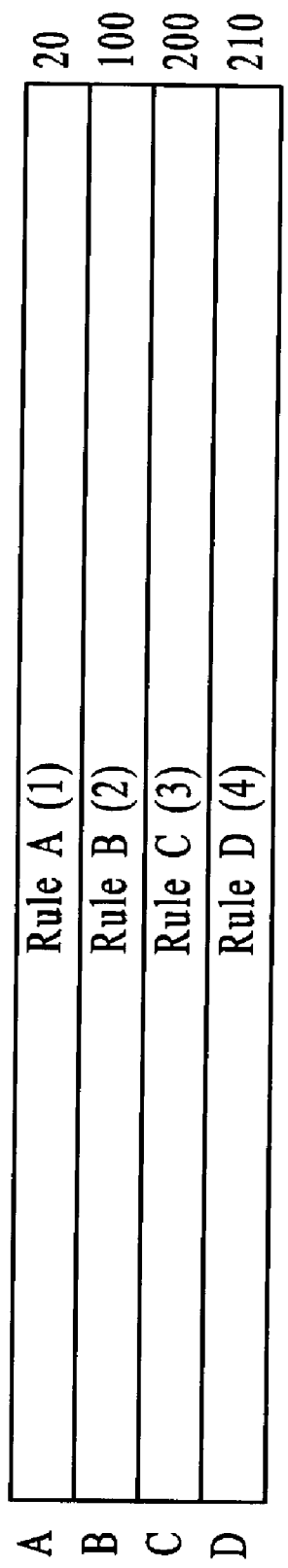
FIG. 2 depicts an embodiment of an ACL that is stored in a CAM array before editing.

FIG. 2 depicts an embodiment of an ACL that is stored in a CAM array before editing. That is, FIG. 2 depicts an instance of an ACL that exists in a CAM array. Note that, although, in the embodiments described with reference to FIGS. 2–17, the ACL is implemented in a CAM array, an ACL may be implemented in many other ways in software and hardware. An ACL that is stored in the CAM array before editing is referred to herein as the "base ACL". Each entry in the ACL (ACL entry) is designated by a capital letter to the left of the CAM array (an ACL entry identifier (ID)). Each ACL entry has a corresponding ACL rule, which is labeled with the same capital letter as the respective ACL entry, indicating that the ACL entry embodies the rule. The number in parenthesis next to the capital letter is a sequence number. A sequence number is an identifier that is attached to an ACL entry and is used in arranging ACL entries, as described further below with respect to FIG. 4. Each ACL entry is located at a CAM location designated by a CAM array address identifier (ID) to the right of the CAM array. In an embodiment, an ACL rule identifies a traffic profile. For example, the ACL rule may identify particular characteristics of the traffic, such as Media Access Control (MAC) destination address, MAC source address, Virtual Local Area Network (VLAN) identifier (ID), Quality of Service (QoS), Internet Protocol (IP) destination address, IP source address, protocol, source socket, destination socket, etc., or any combination thereof. Traffic that matches an ACL rule can be restricted from accessing the respective network node or allowed access to the network node. In a CAM array implementation, ACL entries are arranged in a designated order because ACLs implemented in CAM arrays operate on a first match basis. That is, when a packet is subjected to an ACL, the first ACL rule that matches the profile of an incoming packet determines whether access will be granted or denied to the packet. Therefore, in an ACL that is implemented in a CAM array, the order of ACL entries is important. In an embodiment, the last ACL rule in a CAM array may be an implicit deny.

Figure 3:
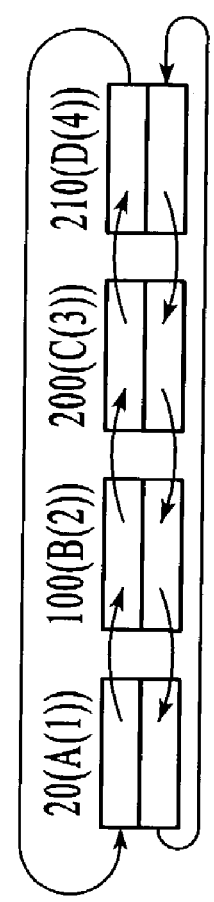
FIG. 3 depicts an embodiment of a linked list that represents the base ACL depicted in the embodiment of FIG. 2, according to an embodiment of the invention.

FIG. 3 depicts an embodiment of a linked list that represents the base ACL depicted in the embodiment of FIG. 2. That is, FIG. 3 depicts an instance of the base ACL that exists in software in the form of a linked list. The linked list is used to manage ACL entries in the CAM array. In an embodiment, the linked list reflects the order of ACL entries in the CAM array and is used to edit the ACL that is stored in the CAM array. In the embodiment depicted in FIG. 3, the linked list is a doubly linked list that includes forward and backward pointers. In an alternate embodiment, the linked list is a singly linked list that includes only forward pointers. For description purposes, the numbers outside of parenthesis on top of each linked list entry correspond to the CAM array address IDs of the respective ACL entries. The capital letters and numbers inside parenthesis correspond to ACL entries and sequence numbers respectively.

FIGS. 4, 5, and 6 depict an embodiment of one iteration of a technique for managing an ACL that is stored in the CAM array depicted in the embodiment of FIG. 2. In an embodiment, managing the ACL includes editing the entries stored in the ACL. As used herein, editing an ACL involves populating the ACL with one or more new ACL entries and/or deleting one or more existing ACL entries from the ACL. Editing an ACL may also involve moving an existing ACL entry to a new location, however, moving an existing ACL entry to a new location is typically accomplished through a combination of ACL entry insertions (populations) and/or deletions. In accordance with an embodiment of the invention, new ACL entries are added to the CAM array without having to rewrite existing ACL entries or with a minimum number of ACL entry rewrites.

In the ACL management technique described with reference to FIGS. 2–13, a linked list that represents an edited ACL is provided for comparison against a linked list that represents a base ACL, such as the linked list depicted in FIG. 3. A linked list that represents an edited ACL is a linked list that corresponds to a base ACL that has been modified to include ACL edits. Typically, ACL edits are input by a user. The order of ACL entries specified by a user for the linked list that represents the edited ACL may differ from the order of ACL entries in the respective linked list that represents a base ACL due to insertions, deletions, or movements of ACL entries. The linked list that represents a base ACL is compared against the linked list that represents an edited ACL using a comparison function. In an embodiment, the comparison function is a DIFF function. In an embodiment, the comparison function outputs differences between the linked list that represents an edited ACL and the linked list that represents the base ACL. In an embodiment, the comparison function outputs the changes that are necessary to make the base ACL the same as the edited ACL. The output from the comparison function is used to populate the CAM.

FIG. 4 depicts examples of a "base ACL", which includes the ACL set A, B, C, and D, and an "edited ACL", which includes the ACL set A, $A_1$, B, C, and D. An ACL set is a set of ACL entries. An ACL set is a type of a position-dependent data set. It will be appreciated that, although the techniques described with reference to FIGS. 2–17 are applied to ACLs as position-dependent data sets, the data sets to which the techniques apply may be any other type of position-dependent data set, such as route maps used for Internet Protocol (IP) policies. The base ACL represents an ACL before editing, and the edited ACL represents the same ACL after it has been modified to include ACL edits. FIG. 4 depicts an instance of the base ACL set existing in software and an instance of the edited ACL set existing in software. In an embodiment, both the base ACL set and the edited ACL set are embodied in linked lists. The edited ACL reflects the order in which the ACL entries should exist in the CAM array. In an embodiment, ACL edits are input by a user through an ACL editing application.

In the example of FIG. 4, as in the examples of FIGS. 2 and 3, the numbers in parenthesis to the right of capital letters are sequence numbers. A sequence number is a number assigned to a position in an ACL set. For example, in the base ACL set of FIG. 4, ACL entry B corresponds to sequence number "2" because ACL entry B is in the second position from the top of the ACL set. In an embodiment, sequence numbers are updated or "reset" at the end of an ACL edit procedure, as described below with respect to FIG. 4. In an embodiment, sequence numbers are consecutive except that when an edited ACL is input, new ACL entries share a common default sequence number until the sequence numbers are reset at the end of the ACL edit procedure. For example, in the example of FIG. 4, ACL entry $A_1$ has a default sequence number of (−1). The main use of sequence numbers is to enable flexible orders of inserting and deleting ACL entries because the sequence numbers, rather than the contents of the ACL (i.e., ACL entries) are used to organize the ACL set. For example, an ACL entry insert may be performed prior to an ACL entry delete and visa versa. Also, in this embodiment, searching for the insert/delete point of an ACL entry involves looking up the sequence numbers, which is much more computationally efficient than searching based on the contents of the ACL. An example of the flexibility introduced by the use of sequence numbers is demonstrated in the example of FIG. 10 below. Although sequence numbers are referred to with reference to FIGS. 2–13, the use of sequence numbers is not required. Other embodiments, such as referring to ACL entries directly, are also contemplated. For this reason, except where otherwise stated, ACL entry identifiers (i.e., capital letters) will be used interchangeably with sequence numbers.

In the example of FIG. 4, a new ACL entry, $A_1$, is designated for insertion after sequence number 1, as displayed in the "DIFF output" column. In an embodiment, after the DIFF output is generated, a determination is made as to what the desired order of modifications to the base ACL set is. In an embodiment, the desired order of modifications is the optimal order for achieving the desired results with respect to CAM population. Therefore, as displayed in the column marked "desired order of modifications", the modifications dictated by the DIFF output can be re-ordered to optimize CAM performance. However, since in the example of FIG. 4, there is only one modification to be made (i.e., only one item of DIFF output), there is no option of re-ordering the modifications. Therefore, the "desired order of modifications" column displays only one modification. Re-ordering modifications is shown in the example of FIG. 10 below.

In the embodiment depicted in FIG. 4, to manage the ACL, the edited ACL set is compared against the base ACL set to determine the differences between the two ACL sets. The ACL sets are compared using a DIFF function. In an embodiment, a DIFF function is a change listing, which determines differences between two files or entries. In an embodiment, the differences between two files or entries may be determined on a line by line basis. In an embodiment, the DIFF function may be similar to a DIFF function as defined in the UNIX programming environment. A DIFF function describes the differences between two files or entries by identifying how to turn a first file or entry into a second file or entry. Other comparison techniques are also contemplated. The comparison technique provides an output that identifies the steps that are needed to change the base ACL set to incorporate the edits contained in the edited ACL set. For example, in the embodiment of FIG. 4, the output of the comparison technique between the base ACL and the edited ACL is "Insert $A_1$ after 1". This output describes how to make the base ACL set the same as the edited ACL set. In an embodiment, the comparison technique outputs the minimum steps needed to change the base ACL set so that it incorporates the edits contained in the edited ACL. In the embodiment depicted in FIG. 4, the output of the comparison technique is identified as "DIFF Output", because a DIFF function is used for the ACL comparison.

The cloud in FIG. 4, as well as in FIGS. 7 and 10, contains icons representing operations that are performed after the desired order of operations is determined. The symbol of a cloud is used because, in an embodiment, the three operations represented within the cloud are performed in parallel. One operation represented within the cloud is the modification of the linked list, as described further below with reference to FIGS. 5, 8, and 11. The second operation represented within the cloud is the population of the CAM array, as is described further below with reference to FIGS. 6, 9, and 12. The third operation represented within the cloud is the editing of the base ACL to include the modifications introduced by the edited ACL. In an embodiment, after these three operations are performed, the sequence numbers are reset. For example, in the example of FIG. 4, the sequence number corresponding to ACL entry $A_1$ is reset from (−1) to (2), and the sequence numbers for the entire ACL set are reset from 1, −1, 2, 3, 4 to 1, 2, 3, 4, 5. In an embodiment, all ACL entries and deletes are performed in a first operational pass of an ACL edit procedure and sequence numbers are reset in a second operational pass of the ACL edit procedure.

FIG. 5 depicts an embodiment of the linked list depicted in FIG. 3 that has been edited based on the DIFF output described with reference to the functions depicted in FIG. 4. As in the embodiment depicted in FIG. 3 above, FIG. 5 depicts an instance of an ACL that exists in software in the form of a linked list. Note that the embodiment depicted in FIG. 5 reflects the insertion of entry $A_1$ into the linked list. Entry $A_1$ has been inserted into the linked list by adjusting the forward pointer of sequence number 1 and the backward pointer of sequence number 2 to identify the new entry. The symbols used with respect to FIG. 3 have similar meanings to those used with respect to FIGS. 5, 8, and 11.

FIG. 6 depicts an embodiment of the CAM array depicted in FIG. 2 after the CAM array has been populated using the DIFF output and the linked list as described above with reference to FIGS. 4 and 5. As in the embodiment depicted in FIG. 2 above, FIG. 6 depicts an instance of an ACL that exists in a CAM array. Note that the embodiment depicted in FIG. 6 reflects that entry $A_1$ has been inserted between entries A(1) and B(2) at CAM array address ID number 33. Also, note that no other changes were made to the CAM, as indicated by the fact that all of the CAM array address ID numbers for the base ACL entries are the same in the embodiments depicted in both FIGS. 2 and 6. That is, the insertion of entry $A_1$ was made without rewriting ACL entries. Rather, the CAM array was merely populated with an additional ACL entry, ACL entry $A_1$ at CAM array address ID 33. The symbols used with respect to FIG. 2 have similar meanings to those used with respect to FIGS. 6, 9, and 12.

Using a linked list enables the efficient identification of available locations within the CAM array that can be used to add new ACL entries to the CAM array without having to rewrite existing ACL entries in the CAM array. That is, the linked list that represents the base ACL is modified based on the DIFF output and this newly modified linked list becomes a pattern for how to edit the base ACL. When the base ACL is edited, only the modifications to the linked list are incorporated into the base ACL. If there are no available locations in the CAM array, the linked list can be used to identify how to populate the CAM array with a reduced number of rewrites, and preferably with a minimum number of rewrites.

When an ACL entry is to be written into the space between two existing ACL entries, determining which CAM location to select can be accomplished in different ways. In an embodiment, the prospective location of the ACL entry that is to be inserted into the CAM array is selected using an algorithm.

FIGS. 7–9 depict an embodiment of a second iteration of the technique for managing an ACL that is stored in a CAM array described with reference to FIGS. 4–6. Note that the previously edited ACL, i.e., the "edited ACL" depicted with reference to FIGS. 4–6, is now the "base ACL" that is depicted in FIG. 7. As in the embodiment depicted in FIG. 4 above, FIG. 7 depicts an instance of a base ACL that exists in software and an instance of an edited ACL that exists in software. In the embodiment depicted in FIG. 7, the edited ACL set differs from the base ACL set in that ACL entry $A_2$ is inserted between ACL entries $A_1$ and B. A comparison technique such as the comparison technique described with reference to FIG. 4, is used to compare the edited ACL set against the base ACL set. For example, a DIFF function may be used as the comparison technique. The output of the comparison technique, i.e. DIFF output, tells how to make the base ACL set the same as the edited ACL set. In the embodiment depicted in FIG. 7, the DIFF output is "Insert $A_2$ after 2". Applying such a procedure to the base ACL set will make the base ACL set the same as the edited ACL set. As in the embodiment of FIG. 4, there is only one modification to be made to the ACL set so the desired order of modifications only reflects one modification. In an embodiment, after the linked list is modified, the CAM array is populated, and the base ACL is edited, the sequence numbers are reset.

FIG. 8 depicts an embodiment of the linked list depicted in FIG. 5 that has been edited based on the DIFF output described with reference to the functions depicted in FIG. 7. As in the embodiments depicted in FIGS. 3 and 5 above, FIG. 8 depicts an instance of an ACL that exists in software in the form of a linked list. Note that the linked list depicted in FIG. 8 reflects the insertion of ACL entry $A_2$ between ACL entries $A_1$ and B. Using a linked list to manage ACL entries in a CAM array enables the efficient identification of available locations within the CAM array. That is, the linked list indicates all of the available CAM locations between each adjacent pair of ACL entries. In addition, the linked list enables the designated order of the ACL entries to be maintained without rewriting existing ACL entries or at least with a minimum of rewriting. That is, the linked list indicates which available CAM locations can be used while still maintaining the designated order of ACL entries in the CAM array.

FIG. 9 depicts an embodiment of the CAM array depicted in FIG. 6 after the CAM array has been populated using the DIFF output and the linked list as described above with reference to FIGS. 7 and 8. As in the embodiments depicted in FIGS. 2 and 6 above, FIG. 9 depicts an instance of an ACL that exists in a CAM array. Note that the embodiment depicted in FIG. 9 reflects that entry $A_2$ has been inserted between entries $A_1$(2) and B(3) at CAM array address ID 72. As in the embodiment described with reference to FIG. 6, the insertion of entry $A_2$ into the CAM array in the embodiment depicted in FIG. 9 is performed without having to rewrite any of the existing ACL entries to the CAM array.

FIGS. 10–12 depict an embodiment of a third iteration of the technique for managing an ACL that is stored in a CAM array described with reference to FIGS. 7–9. Note that the previously edited ACL, i.e., the "edited ACL" depicted with reference to FIGS. 7–9, is now the "base ACL" that is depicted in FIG. 10. As in the embodiment depicted in FIGS. 4 and 7 above, FIG. 10 depicts an instance of a base ACL that exists in software and an instance of an edited ACL that exists in software. In the embodiment depicted in FIG. 10, the edited ACL set differs from the base ACL set in that ACL entries $A_3$ and $A_4$ are inserted between ACL entries A and B, ACL entries $A_1$ and $A_2$ are inserted between ACL entries B and C and ACL entry $C_1$ is inserted between ACL entries C and D. Note that ACL entries $A_1$ and $A_2$ have been moved to a new location in the edited ACL set. In an embodiment, moving ACL entries can be accomplished by a combination of inserts and/or deletes. In the embodiment depicted in FIG. 10, the DIFF output is "Delete 2", "Delete 3", "Insert $A_3$ after 1", "Insert $A_4$ after 1", "Insert $A_1$ after 4", "Insert $A_2$ after 4", and "Insert $C_1$ after 5". Applying such a procedure to the base ACL set will make the base ACL set the same as the edited ACL set. Note that, in an embodiment, back-to-back commands to insert new ACL entries will insert the ACL entries in the order specified. For example, the commands "Insert $A_3$ after 1" and "Insert $A_4$ after 1" will, in an embodiment, insert A3 after 1 and insert A4 after A3.

In the embodiment of FIG. 10, unlike the embodiments of FIGS. 4 and 7, there are multiple modifications to be made to the ACL set (as indicated by multiple lines of DIFF output). Therefore, a desired order of modifications can be determined and the modifications dictated by the DIFF output can be re-ordered. Thus, the desired order of modifications column reflects that the modifications have been re-ordered into the following order: "Insert $A_3$ after 1", "Insert $A_4$ after 1", "Insert $A_1$ after 4", "Insert $A_2$ after 4", "Delete 2", "Delete 3", and "Insert $C_1$ after 5". Such changes to the order of modifications may be desirable to provide the best possible CAM array profile at the earliest possible time, or for other reasons. Note that it does not matter whether inserts are performed before or after deletes due to the use of sequence numbers. In an embodiment, after the desired order of modifications is determined, the linked list is modified, the CAM array is populated, and the base ACL is edited. Then, in a second operational pass, the sequence numbers are reset.

FIG. 11 depicts an embodiment of the linked list depicted in FIG. 8 that has been edited based on the DIFF output described with reference to the functions depicted in FIG. 10. As in the embodiments depicted in FIGS. 3, 5 and 8 above, FIG. 11 depicts an instance of an ACL that exists in software in the form of a linked list. Note that the linked list depicted in FIG. 11 reflects the insertion and deletion of ACL entries as specified above with reference to FIG. 10.

FIG. 12 depicts an embodiment of the CAM array depicted in FIG. 9 after the CAM array has been populated using the DIFF output and the linked list as described above with reference to FIGS. 10 and 11. As in the embodiments depicted in FIGS. 2, 6 and 9 above, FIG. 12 depicts an instance of an ACL that exists in a CAM array. Note that the embodiment depicted in FIG. 12 reflects that ACL entry $A_3$ has been inserted at CAM array address ID 40, ACL entry $A_4$ has been inserted at CAM array address ID 70, ACL entry $A_1$ has been inserted at CAM array address ID 130, ACL entry $A_2$ has been inserted at CAM array address ID 160, and ACL entry $C_1$ has been inserted at CAM array address ID 205. Note also that ACL entry $A_1$ has been deleted from CAM array address ID 33 and ACL entry $A_2$ has been deleted from CAM array address ID 72. As in the embodiment described with reference to FIGS. 6 and 9, the insertions and deletions of ACL entries with respect to the CAM array in the embodiment depicted in FIG. 12 are performed without having to rewrite any of the existing ACL entries to the CAM array.

Figure 13:
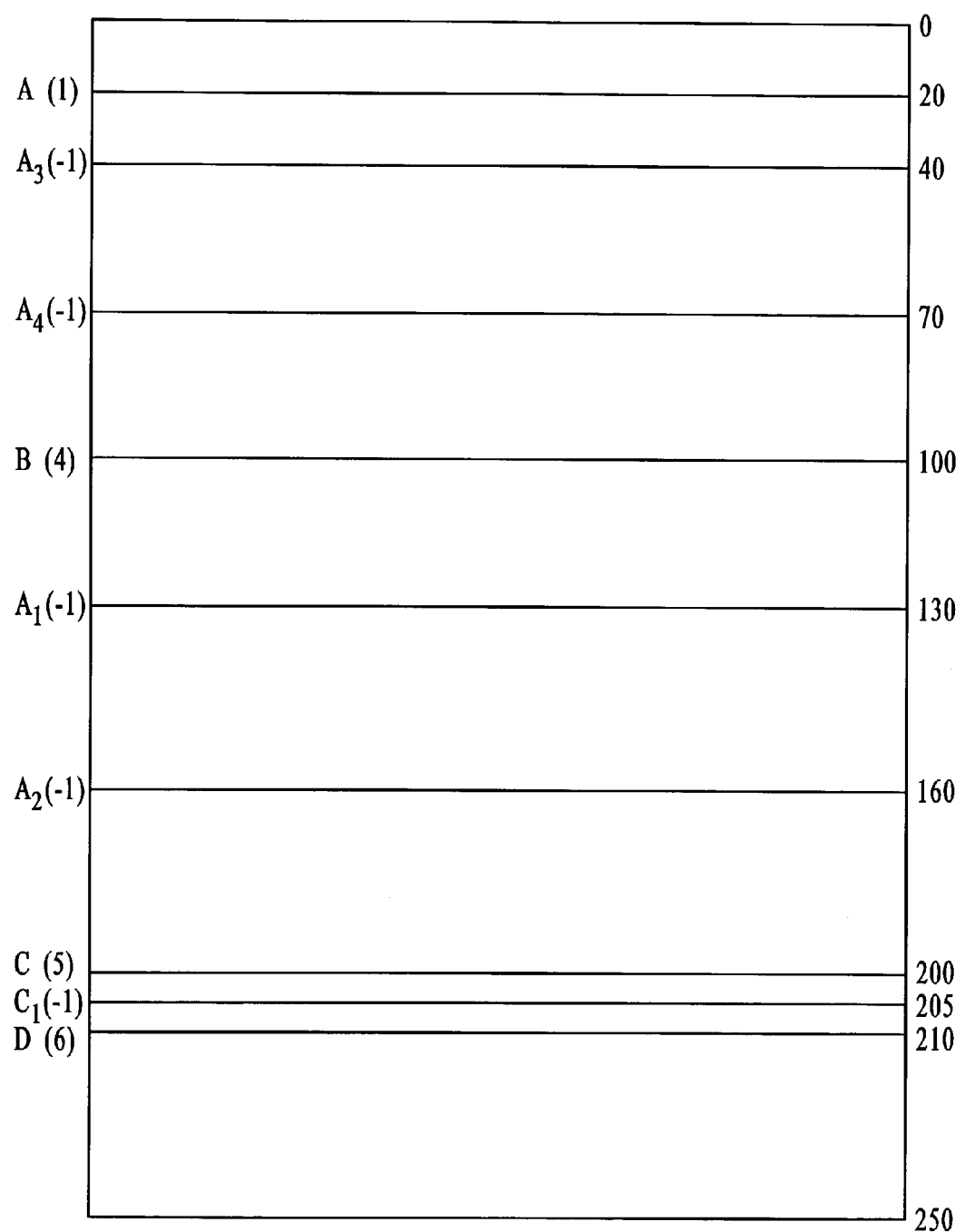
FIG. 13 depicts an embodiment of a CAM array that has been populated according to the techniques described with reference to FIGS. 2–12.

FIG. 13 depicts an embodiment of a CAM array that has been populated according to the techniques described with reference to FIGS. 2–12. The embodiment depicted in FIG. 13 demonstrates how the ACL entries described with reference to FIGS. 2–12 are positioned in an example CAM array. Note that ACL entries $A_3$, $A_4$, $A_1$, $A_2$, and $C_1$ have been added at CAM array address IDs 40, 70, 130, 160, and 205 respectively without having to rewrite any of the existing ACL entries. Also note that ACL entries $A_1$ and $A_2$ have been deleted from CAM array address IDs 33 and 72 respectively. Such a CAM array population scheme can be carried out using linked lists, which is an efficient way to populate a CAM array while maintaining a designated order of CAM array entries.

Figure 14:
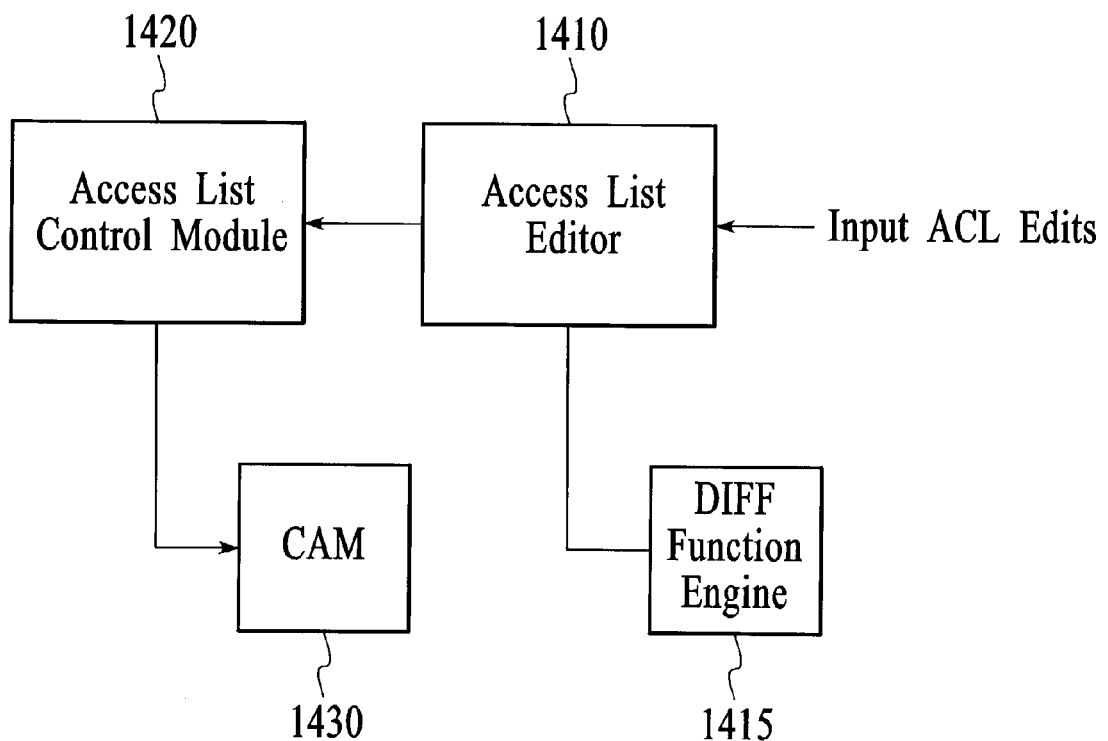
FIG. 14 depicts an embodiment of a system configured to manage an ACL that is stored in a CAM array according to the techniques described with reference to FIGS. 2–13, in accordance with an embodiment of the invention.

FIG. 14 depicts an embodiment of a system configured to manage an ACL that is stored in a CAM array according to the techniques depicted in FIGS. 2–13. In an embodiment, the system includes an access list editor 1410, a DIFF function engine 1415, an access list control module 1420, and a CAM array 1430. In the embodiment depicted in FIG. 14, the access list editor 1410 is a command line interface (CLI) module that receives user input of an edited ACL set. In an embodiment, the access list editor resides in software. It shall be appreciated that while ACLs have been discussed herein, the access list editor is generic. That is, the access list editor, as well the techniques described with reference to FIGS. 2–16, can be used in conjunction with any position-dependent data set, such as route maps used for IP policies.

In the embodiment depicted in FIG. 14, the access list editor is coupled to the DIFF function engine. The DIFF function engine 1415 compares the edited ACL set input by the user against the base ACL set that is stored in the access list editor. In an embodiment, the DIFF function engine is implemented in software. Utilization of the DIFF function engine is exemplary only. Other types of comparison function engines are also contemplated. In an embodiment, the edited ACL set and the base ACL set that are compared against each other are both represented by linked lists. That is, an instance of the base ACL is stored in the CAM, but a software-based linked list that represents the base ACL is used for comparison against the edited ACL set. Similarly, in an embodiment, the edited ACL set input by a user for comparison against the base ACL set is represented by a software-based linked list. However, the ACL sets in the access list editor may be in a form other than a linked list. The access list editor outputs the differences between the two ACL sets. That is, the access list editor outputs the changes that need to be made in order to make the base ACL set the same as the edited ACL set (i.e., DIFF output). The output from the access list editor is sent to the access list control module 1420.

The access list control module 1420 modifies the linked list that represents the base ACL according to the output received from the access list editor (i.e., DIFF output) and manages population of the CAM array 1430. In an embodiment, prior to modifying the linked list and populating the CAM array, the access list control module determines the desired order of modifications to be made to the base ACL. In an embodiment, the access list control module is embodied in software and the CAM array is a hardware storage device. The access list control module populates the CAM array according to the output received from the access list editor (i.e., DIFF output) using the linked list that represents the base ACL that has been newly modified by the access list control module. In an embodiment, the access list control module modifies the base ACL according to the DIFF output and the desired order of modifications. In an embodiment, after the linked list is modified, the CAM array is populated, and the base ACL is modified, the sequence numbers are reset in the access list editor and the access list control module.

Figure 15:
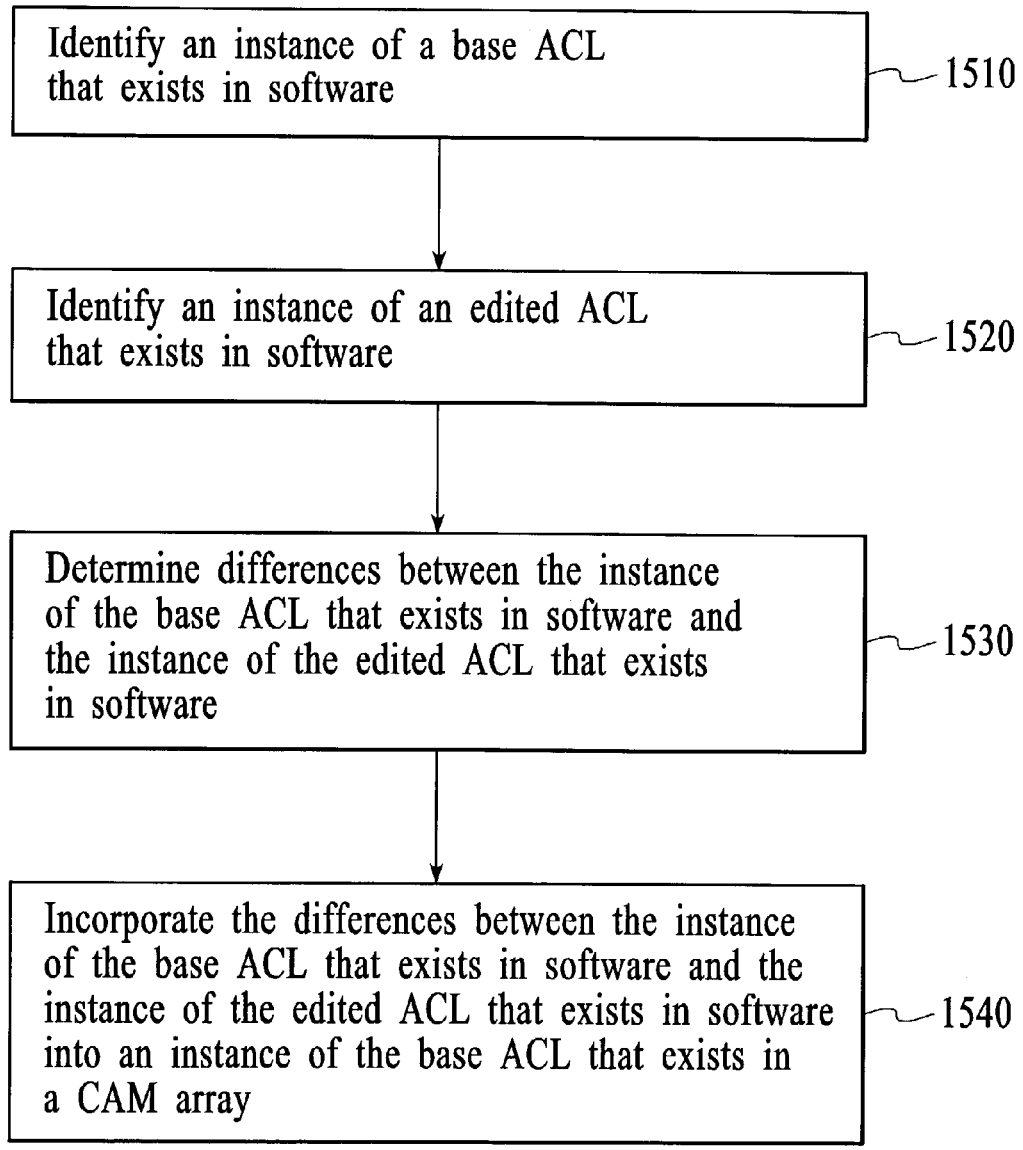
FIG. 15 is flow diagram of one embodiment of a method for managing an ACL that is stored in a CAM array, according to an embodiment of the invention.

FIG. 15 is a flow diagram of one embodiment of a method for managing an ACL that is stored in a CAM array, according to an embodiment of the invention. At block 1510, an instance of a base ACL that exists in software is identified. At block 1520, an instance of an edited ACL that exists in software is identified. At block 1530, differences between the instance of the base ACL that exists in software and the instance of the edited ACL that exists in software are determined. At block 1540, the differences between the instance of the base ACL that exists in software and the instance of the edited ACL that exists in software are incorporated into an instance of the base ACL that exists in a CAM array.

Figure 16:
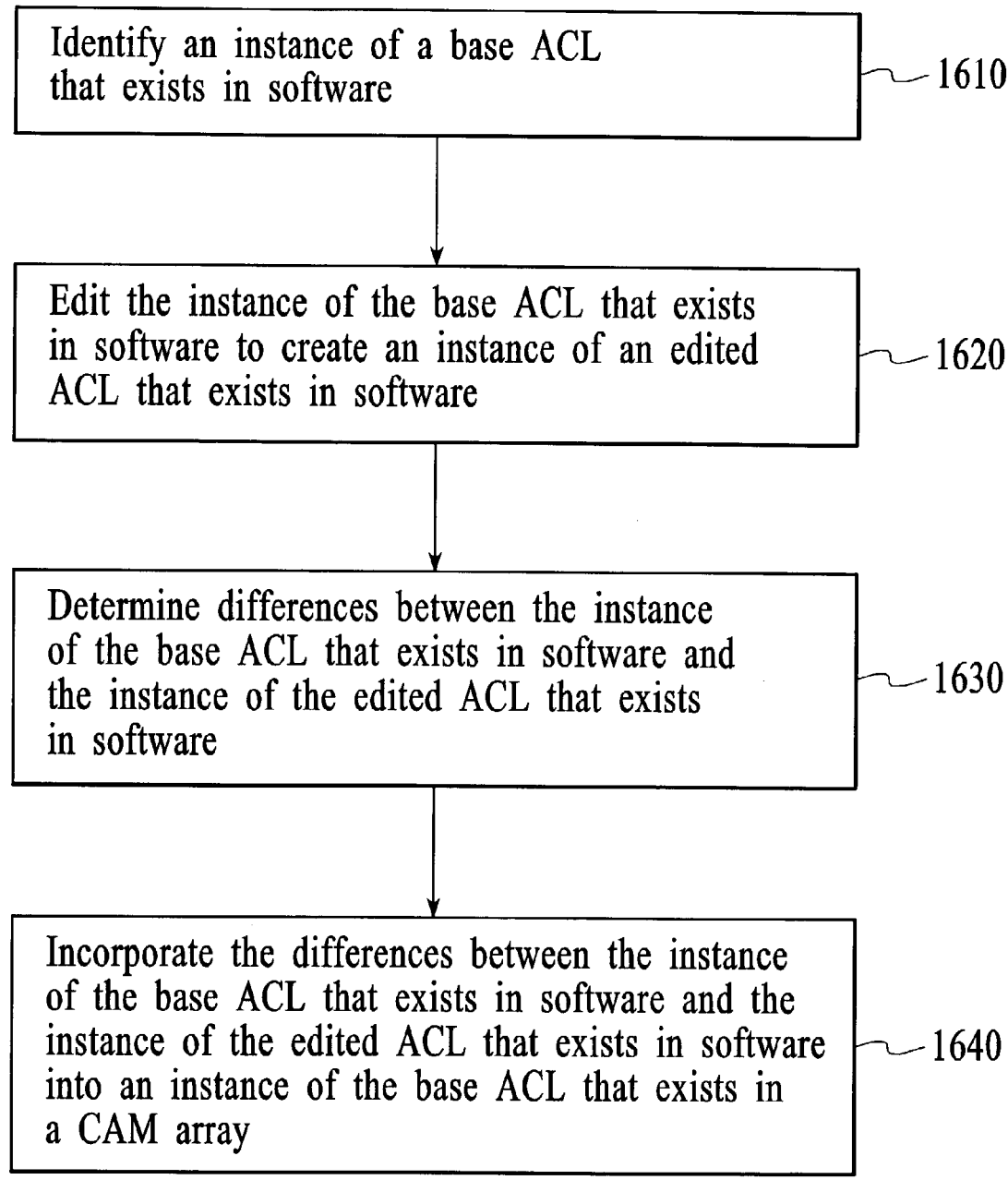
FIG. 16 is flow diagram of another embodiment of a method for managing an ACL that is stored in a CAM array, according to an embodiment of the invention.

FIG. 16 is a flow diagram of another embodiment of a method for managing an ACL that is stored in a CAM array, according to an embodiment of the invention. At block 1610, an instance of a base ACL that exists in software is identified. At block 1620, the instance of the base ACL that exists in software is edited to create an instance of an edited ACL that exists in software. At block 1630, differences between the instance of the base ACL that exists in software and the instance of the edited ACL that exists in software are determined. At block 1640, the differences between the instance of the base ACL that exists in software and the instance of the edited ACL that exists in software are incorporated into an instance of the base ACL that exists in a CAM array.

Figure 17:
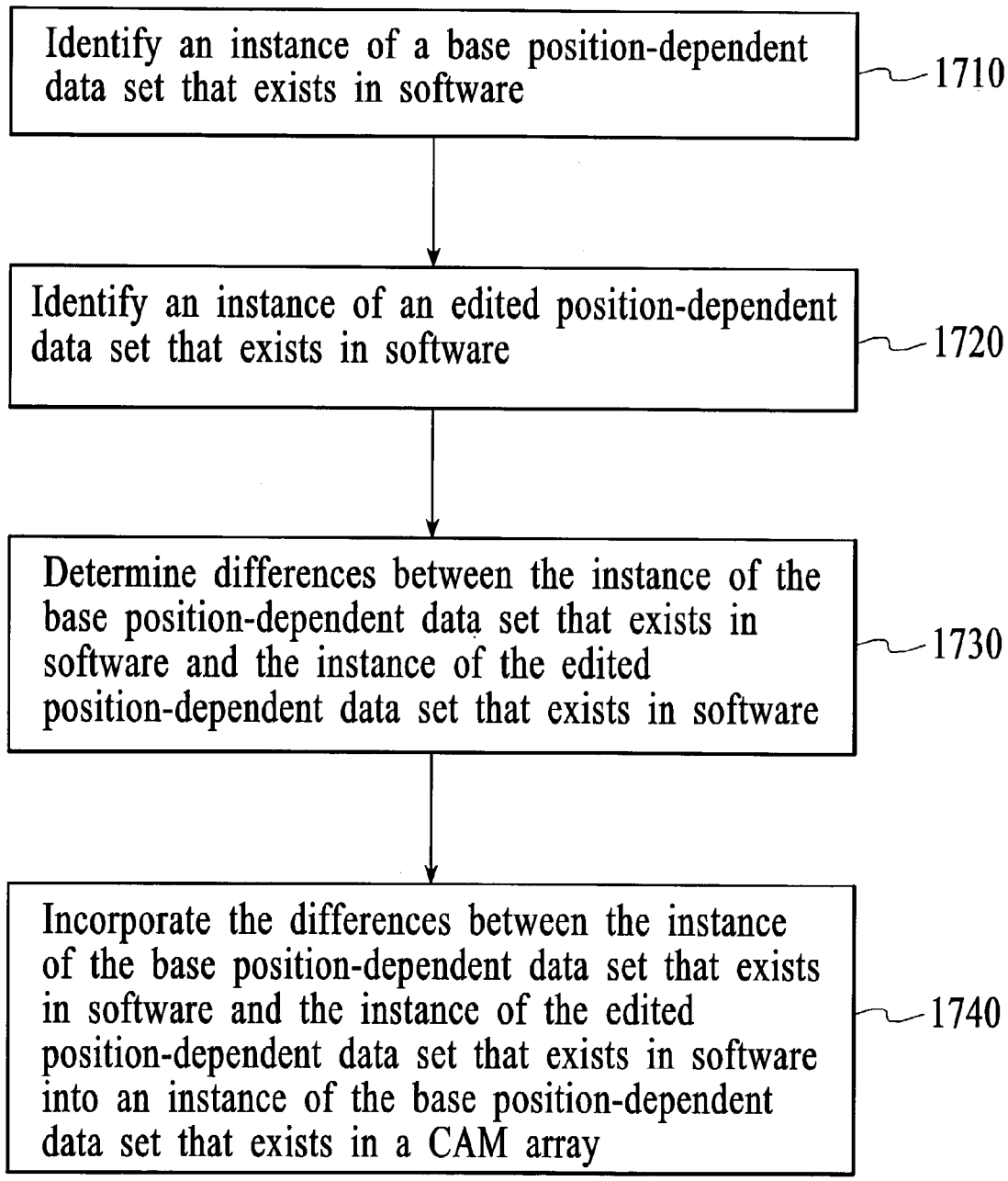
FIG. 17 is a flow diagram of an embodiment of a method for managing a position-dependent data set that is stored in a CAM array, according to an embodiment of the invention.

Although the techniques described with reference to FIGS. 2–16 refer to ACLs, the techniques may be used in conjunction with any position-dependent data set. FIG. 17 is a flow diagram of an embodiment of a method for managing a position-dependent data set that is stored in a CAM array, according to an embodiment of the invention. At block 1710, an instance of a base position-dependent data set that exists in software is identified. At block 1720, an instance of an edited position-dependent data set that exists in software is identified. At block 1730, differences between the instance of the base position-dependent data set that exists in software and the instance of the edited position-dependent data set that exists in software are determined. At block 1740, the differences between the instance of the base position-dependent data set that exists in software and the instance of the edited position-dependent data set that exists in software are incorporated into an instance of the base position-dependent data set that exists in a CAM array.

It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims

What is claimed is:

1. A system for managing a position-dependent data set that is stored in a content addressable memory (CAM) array comprising:
 a CAM array configured to store an instance of a base position-dependent data set;
 a list editor configured to receive user input that defines an instance of an edited position-dependent data set that exists in software, wherein said edited position-dependent data set is an edited version of said base position-dependent data set;
 a comparison function engine configured to determine differences between said instance of said edited position-dependent data set that exists in software and an instance of said base position-dependent data set that exists in software; and
 a list control module configured to incorporate differences between said instance of said edited position-dependent data set that exists in software and said instance of said base position-dependent data set that exists in software into an instance of said base position-dependent data set that exists in said CAM array.

2. A system for managing an access control list (ACL) that is stored in a content addressable memory (CAM) array comprising:
 a CAM array configured to store an instance of a base ACL;
 an access list editor configured to receive user input that defines an instance of an edited ACL that exists in software, wherein said edited ACL is an edited version of said base ACL;
 a comparison function engine configured to determine differences between said instance of said edited ACL that exists in software and an instance of said base ACL that exists in software; and
 an access list control module configured to incorporate differences between said instance of said edited ACL that exists in software and said instance of said base ACL that exists in software into an instance of said base ACL that exists in said CAM array.

3. The system of claim 2 wherein said comparison function engine applies a DIFF function to said instance of said edited ACL that exists in software and to said instance of said base ACL that exists in software, wherein the DIFF function produces a DIFF output that identifies the changes that need to be made to the base ACL to make the base ACL the same as the edited ACL.

4. The system of claim 3 wherein the DIFF output includes a difference component and a position component for each entry that is to be added to the CAM array.

5. A method for managing an access control list (ACL) that is stored in a content addressable memory (CAM) array comprising:
 identifying an instance of a base ACL that exists in software;
 editing said instance of said base ACL that exists in software to create an instance of an edited ACL that exists in software;
 determining differences between said instance of said base ACL that exists in software and said instance of said edited ACL that exists in software; and
 incorporating said differences between said instance of said base ACL that exists in software and said instance of said edited ACL that exists in software into an instance of said base ACL that exists in a CAM array.

6. The method of claim 5 further comprising using a linked list representation of the edited ACL to incorporate said differences between said instance of said base ACL that exists in software and said instance of said edited ACL that exists in software into said instance of said base ACL that exists in said CAM array.

7. The method of claim 6 further comprising using said differences between said instance of said base ACL that exists in software and said instance of said edited ACL that exists in software to modify a linked list representation of the base ACL to yield the linked list representation of the edited ACL.

8. The method of claim 7 further comprising using said linked list representation of the edited ACL to identify an available location to insert an ACL entry in said CAM array.

9. The method claim 7 further comprising using said linked list representation of the edited ACL to identify an available location to insert an ACL entry in said CAM array that maintains a designated order of ACL entries that form said ACL.

10. The method of claim 5 wherein said determining differences between said instance of said base ACL that exists in software and said instance of said edited ACL that exists in software includes applying a DIFF function, wherein the DIFF function produces a DIFF output that identifies the changes that need to be made to the base ACL to make the base ACL the same as the edited ACL.

11. The method of claim 10 wherein the DIFF output includes a difference component and a position component for each entry that is to be added to the CAM array.

12. A method for managing an access control list (ACL) that is stored in a content addressable memory (CAM) array comprising:
   identifying a linked list that represents a base ACL that is stored in a CAM array;
   identifying a linked list that represents an edited ACL, wherein said edited ACL is an edited version of said base ACL;
   determining differences between said linked list that represents said base ACL and said linked list that represents said edited ACL;
   using said differences to modify said linked list that represents said base ACL to generate an edited linked list; and
   using said edited linked list to incorporate modifications dictated by said differences into said base ACL that is stored in said CAM array.

13. The method of claim 12 wherein said determining differences between said linked list that represents said base ACL and said linked list that represents said edited ACL includes applying a DIFF function, wherein the DIFF function produces a DIFF output that identifies the changes that need to be made to the base ACL to make the base ACL the same as the edited ACL.

14. The method of claim 13 wherein the DIFF output includes a difference component and a position component for each entry that is to be added to the CAM array.

15. The method of claim 12 further comprising using said edited linked list to identify an available location in said CAM array to insert an ACL entry.

16. The method claim 12 further comprising using said edited linked list to identify an available location in said CAM array to insert an ACL entry that maintains a designated order of ACL entries that form said ACL.

17. A method for managing an access control list (ACL) that is stored in a content addressable memory (CAM) array comprising:
   identifying an instance of a base ACL that exists in software;
   identifying an instance of an edited ACL that exists in software, wherein said edited ACL is an edited version of said base ACL;
   determining differences between said instance of said base ACL that exists in software and said instance of said edited ACL that exists in software; and
   incorporating said differences between said instance of said base ACL that exists in software and said instance of said edited ACL that exists in software into an instance of said base ACL that exists in a CAM array.

18. The method of claim 17 wherein said determining differences between said instance of said base ACL that exists in software and said instance of said edited ACL that exists in software includes applying a DIFF function, wherein the DIFF function produces a DIFF output that identifies the changes that need to be made to the base ACL to make the base ACL the same as the edited ACL.

19. The method of claim 18 wherein the DIFF output includes a difference component and a position component for each entry that is to be added to the CAM array.

20. The method of claim 17 further comprising using a linked list representation of the edited ACL to incorporate said differences between said instance of said base ACL that exists in software and said instance of said edited ACL that exists in software into said instance of said base ACL that exists in said CAM array.

21. The method of claim 20 further comprising using said differences to modify a linked list representation of the base ACL to yield the linked list representation of the edited ACL.

22. The method of claim 21 further comprising using said linked list representation of the edited ACL to identify an available location to insert an ACL entry in said CAM array.

23. The method claim 21 further comprising using said linked list representation of the edited ACL to identify an available location to insert an ACL entry in said CAM array that maintains a designated order of ACL entries that form said ACL.

24. The method of claim 21 further comprising using a changeable sequence number to identify a position of an ACL entry within an ACL.

25. A method for managing a position-dependent data set that is stored in a content addressable memory (CAM) array comprising:
   identifying an instance of a base position-dependent data set that exists in software;
   identifying an instance of an edited position-dependent data set that exists in software, wherein said edited position-dependent data set is an edited version of said base position-dependent data set;
   determining differences between said instance of said base position-dependent data set that exists in software and said instance of said edited position-dependent data set that exists in software; and
   incorporating said differences between said instance of said base position-dependent data set that exists in software and said instance of said edited position-dependent data set that exists in software into an instance of said base position-dependent data set that exists in a CAM array.

26. The method of claim 1 wherein said determining differences between said instance of said base position-dependent data set that exists in software and said instance of said edited position-dependent data set that exists in software includes applying a DIFF function, wherein the DIFF function produces a DIFF output that identifies the chances that need to be made to the base position-dependent data set to make the base position-dependent data set the same as the edited position-dependent data set.

27. The method of claim 26 wherein the DIFF output includes a difference component and a position component for each entry that is to be added to the CAM array.

28. The method of claim 1 further comprising using a linked list representation of the edited position-dependent data set to incorporate said differences between said instance of said base position-dependent data set that exists in software and said instance of said edited position-dependent data set that exists in software into said instance of said base position-dependent data set that exists in said CAM array.

29. A method for managing an access control list (ACL) that is stored in a content addressable memory (CAM) array comprising:
   identifying a linked list that represents a base access control list;
   identifying a linked list that represents an edited access control list;
   applying a DIFF function to said linked list that represents said edited access control list and said linked list that represents said base access control list to determine changes that need to be made to the linked list that represents the base access control list in order to make said linked list that represents said base access control list the same as said linked list that represents said edited access control list, said changes being represented by a DIFF output;

modifying said linked list that represents said base access control list based on said DIFF output to make said linked list that represents said base access control list the same as said linked list that represents said edited access control list;

using said modified linked list to determine how to populate said CAM array; and populating said CAM array in response to said modified linked list.

30. The method of claim 29 wherein the DIFF output includes a difference component and a position component for each entry that is to be added to the CAM array.

* * * * *

UNITED STATES PATENT AND TRADEMARK OFFICE
CERTIFICATE OF CORRECTION

PATENT NO. : 6,961,809 B2
DATED : November 1, 2005
INVENTOR(S) : Krishnan et al.

It is certified that error appears in the above-identified patent and that said Letters Patent is hereby corrected as shown below:

Column 14,
Lines 39 and 51, should read -- The method of claim 25 -- instead of "The method of claim 1".

Signed and Sealed this

Seventh Day of February, 2006

JON W. DUDAS
*Director of the United States Patent and Trademark Office*